United States Patent
Gautier et al.

(10) Patent No.: US 11,059,496 B2
(45) Date of Patent: Jul. 13, 2021

(54) GROUND-BASED POWER SUPPLY AND ASSOCIATED REINFORCING METHOD

(71) Applicant: ALSTOM Transport Technologies, Saint-Ouen (FR)

(72) Inventors: Yann Gautier, Hermonville (FR); Quentin Gardille, Tinqueux (FR); Florian Ribalka, Saint-Memmie (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 348 days.

(21) Appl. No.: 16/163,987

(22) Filed: Oct. 18, 2018

(65) Prior Publication Data

US 2019/0118835 A1   Apr. 25, 2019

(30) Foreign Application Priority Data

Oct. 19, 2017   (FR) ...................................... 17 59812

(51) Int. Cl.
*B60M 1/30*   (2006.01)
*B61B 3/02*   (2006.01)
(Continued)

(52) U.S. Cl.
CPC ........ *B61B 3/02* (2013.01); *B60L 5/18* (2013.01); *B60M 1/106* (2013.01); *B60M 1/28* (2013.01); *B60M 1/34* (2013.01); *B61B 12/026* (2013.01)

(58) Field of Classification Search
CPC .... B60L 5/18; B60L 5/40; B60L 5/42; B60M 1/106; B60M 1/28; B60M 1/34; B60M 1/30; B60M 1/302; B60M 1/307; B60M 1/305; B60M 1/346; B60M 1/36; B61B 12/026; B61B 3/02; B61B 9/00
See application file for complete search history.

(56) References Cited

U.S. PATENT DOCUMENTS 5,249,654 A * 10/1993 Bruning ................. B60M 1/302
                                                191/22 DM
9,616,772 B2 * 4/2017 Hourtane .................. B60L 5/39
(Continued)

FOREIGN PATENT DOCUMENTS

EP     1043186 A1   10/2000
EP     2907690 A1    8/2015
(Continued)

OTHER PUBLICATIONS

Search Report for French Application No. FR 17 59812 dated Jun. 12, 2018.

*Primary Examiner* — Mark T Le
(74) *Attorney, Agent, or Firm* — Pearne & Gordon LLP

(57) ABSTRACT

A power supply system comprising a track, which defines a trajectory, wherein the track comprises a track segment terminating at a segment end in a forward direction of the trajectory, and a hood, which is arranged in the extension of the track segment along the trajectory in the forward direction beyond the segment end; while a stringer, which supports the track segment, extends along the trajectory and terminates with a cut end in the forward direction. The system further comprises a reinforcing piece, which is applied against the cut end, in order to extend the stringer in the forward direction, wherein the reinforcing piece is essentially made of plastic and supports the hood.

11 Claims, 3 Drawing Sheets

(51) Int. Cl.
*B60M 1/34* (2006.01)
*B60L 5/18* (2006.01)
*B60M 1/10* (2006.01)
*B60M 1/28* (2006.01)
*B61B 12/02* (2006.01)

(56) References Cited

U.S. PATENT DOCUMENTS

| | | | | |
|---|---|---|---|---|
| 2008/0012364 A1* | 1/2008 | Boggess | ........... | F16F 7/122 |
| | | | | 293/120 |
| 2010/0175961 A1* | 7/2010 | Rameau | ........... | B60M 1/307 |
| | | | | 191/22 DM |
| 2012/0238686 A1* | 9/2012 | Nakamura | ........... | C08K 3/34 |
| | | | | 524/451 |
| 2015/0224999 A1* | 8/2015 | Duprat | ........... | B60M 1/34 |
| | | | | 238/14.3 |
| 2015/0274035 A1* | 10/2015 | Hourtane | ........... | B60M 7/00 |
| | | | | 191/6 |

FOREIGN PATENT DOCUMENTS

| | | |
|---|---|---|
| FR | 2938800 A1 | 5/2010 |
| FR | 3017342 A1 | 8/2015 |

\* cited by examiner

GROUND-BASED POWER SUPPLY AND ASSOCIATED REINFORCING METHOD

TECHNICAL FIELD

The present invention relates to a ground-based power supply system and a method of reinforcing such a system.

The present invention relates, in particular, to the field of maintenance of power supply means for rail transport vehicles.

BACKGROUND

A ground-based power supply system is known, wherein a third rail is implanted in the ground between two rails of a tramway and is designed to supply electricity to the tramway by means of a runner or "pickup shoe" mounted in the lower part of the tram, wherein this runner is brought into frictional contact along the power rail as and when the tramway moves. The power rail is segmented into several successive sections, which are selectively energized only when covered by a tramway. Thus, the power system may be installed safely in the city.

FR 2 938 800 A1 discloses an electric power rail segment, comprising a support profile of insulating material. The profile comprises a core pierced with longitudinal ducts to receive power cables, and to receive, on an upper face of the core, a power supply track that is housed in a longitudinal groove of the upper face. The profile rests on the ground via a lower face of the core. Several successive segments form a power rail by assembling their respective profiles with the aid of fishplates. Between two successive segments, a longitudinal space is left free, wherein this space is bordered laterally by flanges of the fishplate. The fishplate also includes a cover or hood with a thickness equal to that of the track in order to close this space from above. The cover is supported by ribs provided on the inner faces of the flanges and at the same height as the groove of the upper face. The cover thus connects the respective tracks of the two segments, so that the sliding of the pickup shoe is effected smoothly from one track to the next through the cover of equal thickness.

However, the power rails comprising such covers are likely to be damaged in locations of high affluence. In fact, the repeated rolling of dense urban traffic over the power rail and/or heavy use of the power rail by the trams, are likely to deteriorate the supports of the cover, in particular the ribs of the fishplate and/or the profile. Thus, as a result of this wear, the cover may be depressed or tilted with respect to its initial position, or, at least, may not be at the same height as the power track. Vandalism may also be the cause of this deterioration. As a result, the passage of the pickup shoe at the cover is likely to generate a noisy shock at each passage. Such shocks increase the deterioration rate of the power rail and the pickup shoe. In certain situations, the passage of the pickup shoe may even cause a particularly harmful reversal or ejection of the cover.

SUMMARY

As a result, the invention aims to overcome the aforementioned drawbacks of the prior art, by proposing a new power supply system offering increased service life and compatibility with existing equipment, in order to increase the service life.

The object of the invention is a ground-based system for powering a vehicle, wherein the system comprises:

- a track, which defines a trajectory of the system, wherein the track is designed to be in contact with a pickup shoe of the vehicle during movement of the vehicle along the trajectory, wherein the track comprises:
  - at least one track segment terminating at a segment end in a forward direction of the trajectory, and
  - at least one hood, which is arranged in the extension of the track segment along the trajectory, in the forward direction, beyond the segment end;
- at least one stringer, which supports the track segment and which extends along the trajectory ending with a cut end in the forward direction.

According to the invention, the system further comprises at least one reinforcing piece, which is applied against the cut end, in order to extend the stringer in the forward direction, wherein the reinforcing piece is essentially made of plastic and supports the hood.

Thanks to the invention, the substantially plastic reinforcing piece is arranged at the end of the stringer, which is a wear-sensitive zone. This reinforcing piece may be easily installed at the cut end of the stringer and replaced by another reinforcing piece if necessary, which thus extends the service life of the supply system and avoids, in particular, the complete replacement of the stringer, or the introduction of a sealing material to fill the damaged parts of the stringer. This reinforcing piece is, in particular, less expensive, more resistant and easier to install, while allowing precise positioning of the hood, when compared with the other solutions mentioned. It is possible to install such a reinforcing piece within an existing power supply system, by implementing the strengthening method defined below. As it is essentially plastic, the reinforcing piece is preferably electrically insulating and easy to modify on site by machining, for example using hand tools, in order to adapt this reinforcing piece to suit the case in question.

Other optional and advantageous features of the invention are defined below:

- The plastic material of the reinforcing piece is polyamide-6, while the stringer is preferably made of pultruded fiberglass composite material;
- The stringer comprises a stringer groove, which extends along the trajectory to the cut end in the forward direction, wherein the track segment is housed in the stringer groove; and wherein the reinforcing piece comprises a reinforcing groove, which extends the stringer groove in the forward direction, wherein the hood is arranged at least partly in the reinforcing groove and is supported by the reinforcing piece;
- The stringer comprises two stringer edges, bordering the stringer groove; while the reinforcing piece comprises two reinforcing edges, bordering the reinforcing groove and extending the groove borders in the forward direction, wherein the hood is arranged at least partly in the reinforcing groove without covering the reinforcing edges;
- The stringer comprises two antenna holes, which extend into the stringer, respectively along the stringer edges, and open at the cut end; wherein the reinforcing piece comprises two reinforcing wings, which project opposite one another, wherein each of the two reinforcing wings supports one of the reinforcing edges, wherein the reinforcing piece comprises two antenna ducts, wherein each of the two antenna ducts pass through one of the two reinforcing wings, and wherein the reinforcing piece is so arranged that each of the two antenna ducts respectively extends one of the two antenna holes in the forward direction; and wherein the system comprises at least one antenna cable, which passes through one of the two antenna holes and the two antenna ducts;

the system comprises a support on which the stringer and the reinforcing piece rest; and the reinforcing piece comprises a base, through which the reinforcing piece rests on the support, wherein the base comprises at least one sealing notch that extends parallel to the trajectory and opens radially with respect to the trajectory, wherein a sealing material is introduced into the sealing notch to fix the reinforcing piece to the support;

the cover is fixed on the reinforcing piece by means of at least one mechanical fixing device, wherein the mechanical device comprises a primary element, for example a screw or a rivet, and a secondary element to which the primary element is attached, for example a nut; wherein the reinforcing piece comprises an access hole, which opens in the forward direction on an access face of the reinforcing piece; and the primary element of the mechanical device passes through the hood and the reinforcing piece in order to extend into the access hole, in which the secondary element is housed;

the stringer comprises at least one wiring cavity, which extends along the trajectory and which opens at the cut end; wherein the reinforcing piece comprises at least one wiring duct, and the reinforcing piece is so arranged that the wiring duct extends the wiring cavity in the forward direction; and the system comprises at least one track power cable, which passes through the wiring cavity and the wiring duct.

The object of the invention is also a method of reinforcing a ground-based system for supplying a vehicle with electricity, wherein the system comprises:

a track, which defines a trajectory of the system, wherein the track is designed to be in contact with a pickup shoe of the vehicle during movement of the vehicle along the trajectory, wherein the track comprises:
  at least one track segment terminating at a segment end in a forward direction of the trajectory, and
  at least one hood, which is arranged in the extension of the track segment along the trajectory, in the forward direction, beyond the segment end;
at least one stringer, which supports the track segment and extends along the trajectory and ends at a stringer end in the forward direction, wherein the stringer comprises a part to be replaced, extending from the stringer end, in a direction opposite to the forward direction, wherein the hood is supported by the part to be replaced;

According to the invention, the method comprises the following successive steps:
  separating the part to be replaced from the stringer, so that the stringer ends with a cut end in the forward direction;
  addition of at least one reinforcing piece at the cut end by bringing the reinforcing piece against, or opposite, the cut end, in order to extend the stringer in the forward direction, wherein the reinforcing piece is essentially made of plastic; and
  mounting the hood on the reinforcing piece, so that the hood is supported by the reinforcing piece.

Preferably, the stringer has at least one empty hole, which extends along the trajectory and which opens at the cut end; and the method comprises a step of introducing at least one reinforcing bar of plastic into the empty hole, in a manner that is designed to support the empty hole, wherein the plastic material of the reinforcing bar is preferably the same plastic material as the reinforcing piece.

BRIEF DESCRIPTION OF THE DRAWINGS

The invention will be better understood with the aid of the description which follows, given by way of a nonlimiting example and with reference to the appended drawings, wherein.

DETAILED DESCRIPTION OF SOME EMBODIMENTS

Figure 1:
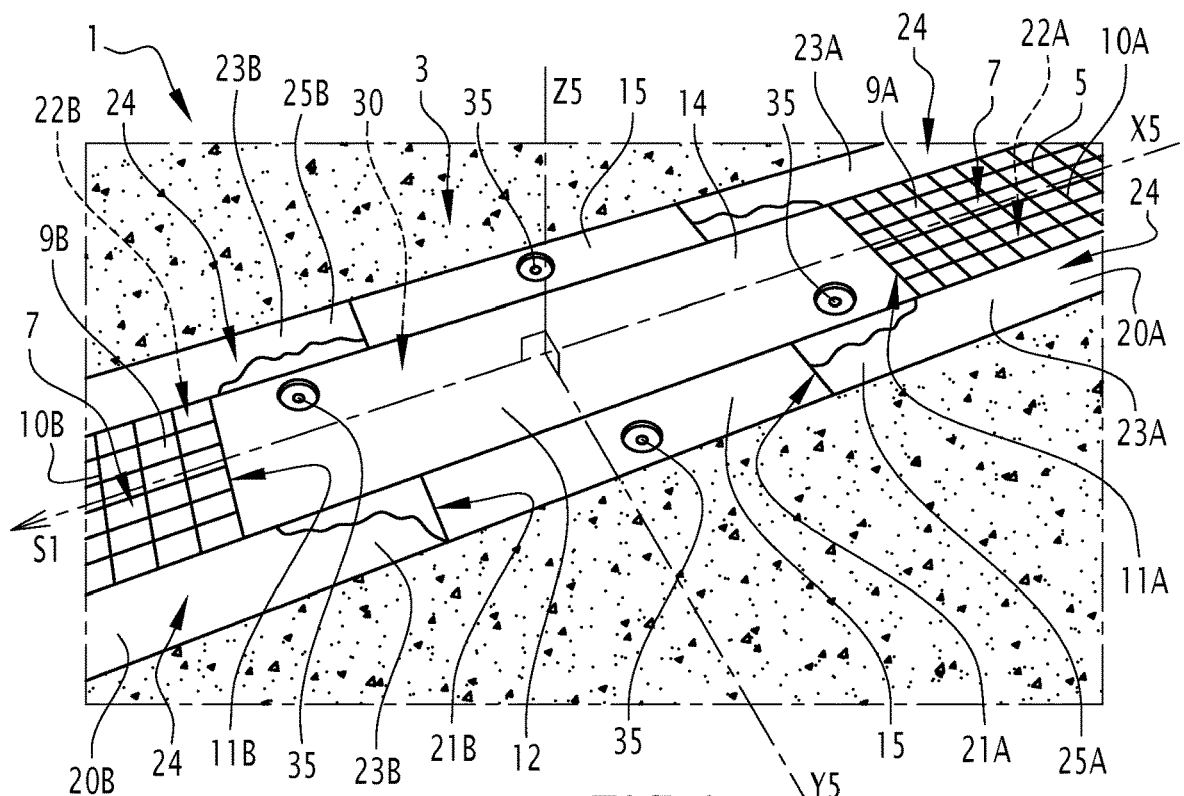
FIG. 1 shows a perspective view of a power supply system in an initial state.

FIG. 1 shows a power supply system 1 for one or more vehicles (not illustrated), preferably one or more rail vehicles, in particular of the tramway type. Preferably, the power supplied by the system 1 is used to ensure the traction of the vehicle by powering a motor on board the vehicle. For example, the system 1 provides a voltage between 350 and 2000 V, for example 750 V. This power supply is ground-based and the system 1 is arranged at or near the surface of the ground 3.

In FIG. 1, the system 1 is in an initial state. This initial state corresponds to the situation where the system has not yet been modified by the reinforcing method according to the invention. In this initial state, the system may have been damaged, for example by wear or vandalism, as explained in the introductory part above. The reinforcing method may also be applied to the system 1 while it is in the initial state, but without wear or vandalism.

The system 1 comprises a track 5, only part of which is visible in the figures. The track 5 extends along a certain trajectory, which is a longitudinal trajectory, represented by the broken line X5 in the figures. In the part of the system shown in the figures, the trajectory X5 is rectilinear. However, the trajectory X5 may have curvatures that the track 5 follows in order to define curves for the vehicle.

A movable geometric reference is defined along the trajectory X5. This reference comprises the trajectory X5, a transverse axis Y5 that is perpendicular to the trajectory X5 and parallel to the ground 3, and a height axis Z5 that is perpendicular to the trajectory X5 and the axis Y5. Terms such as "longitudinal" and "length" refer to an orientation parallel to the trajectory X5. Terms such as "transverse", "lateral" or "width" refer to an orientation parallel to the Y5 axis. Terms such as "height", "high", "above", "low" or "below" refer to an orientation parallel to the Z5 axis. Specifically, "up" or "above" refers to a direction parallel to the Z5 axis pointing towards the sky when the system 1 is installed in the ground 3, while "down" or "below" refer to a direction in the opposite direction. A forward direction S1 of the trajectory X5 is defined.

The track 5 has a contact surface 7 in a plane X5-Y5 defined by the trajectory X5 and the axis Y5. The surface 7 is turned upwards.

Figure 2:
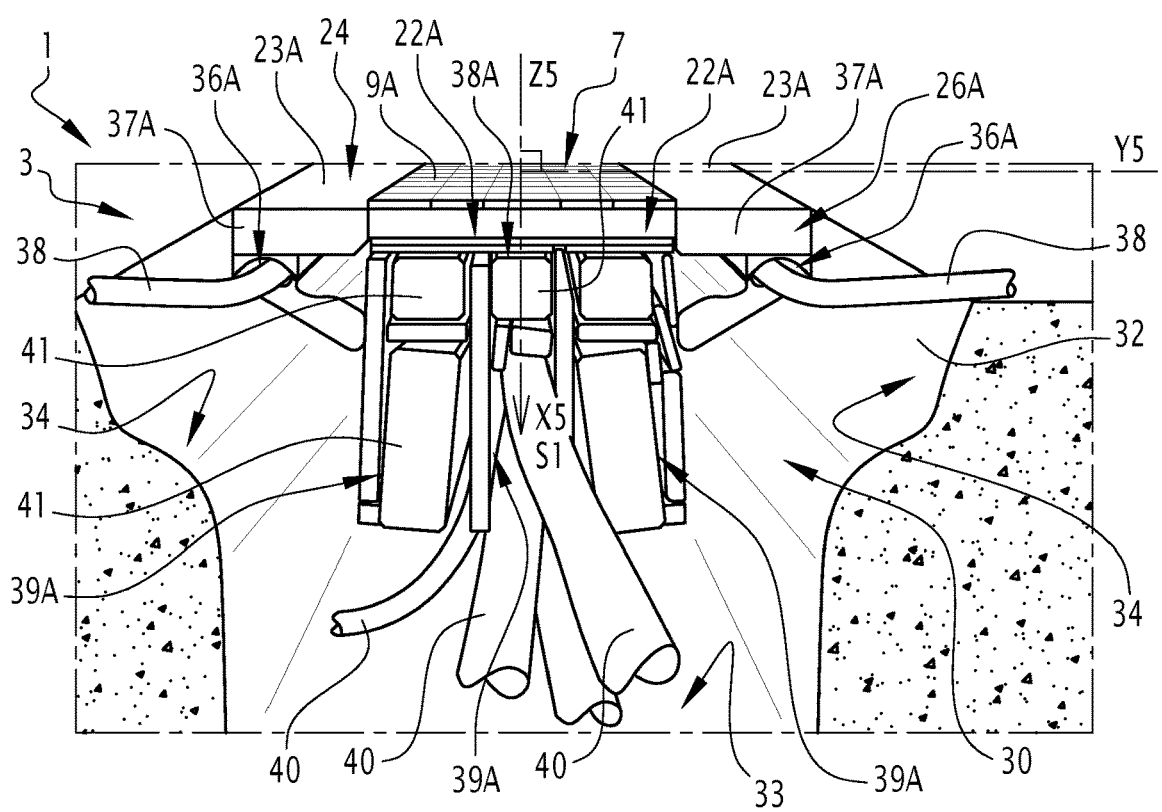
FIGS. 2 and 3 show views of the inside of the system of FIG. 1, following certain steps of a reinforcing method according to the invention have been carried out, in particular the addition of a reinforcing piece shown in FIG. 3.

In this case, the system 1 is embedded in the ground 3, so that the surface 7 is substantially coplanar with the surface of the ground 3, or, preferably, slightly above. For this, the system 1 is partially buried in a longitudinal furrow 32 in the ground 3. The furrow 32 is preferably in the form of a cradle made of concrete, reinforced tar or any other material of similar mechanical properties, wherein this cradle also forms the ground surface 3 around the track 5. As seen in FIG. 2, and wherein the furrow 32, whose transverse section has, for example, the general shape of a U or V, comprises a bottom 33. The furrow 32 also comprises two side walls 34 that are inclined or parallel to the axis Z5 and connect the bottom 33 to the surface of the ground 3.

Alternatively, the track 5 may be above the ground 3, so that the contact surface 7 itself protrudes above the ground 3, wherein the system is not in the form of a furrow but is arranged on the surface of the ground 3.

The surface 7 is designed to be in contact, in a sliding or rubbing manner, with a pickup shoe of the vehicle to be powered. In the case of a rail vehicle, provision is also made for one or more vehicle running rails along the trajectory X5. These rails preferably extend laterally away from the track 5, on either side of the track 5, along trajectories parallel to the trajectory X5, in order to guide the vehicle along the trajectory X5 and keep its pickup shoe in contact with the surface 7 throughout the movement of the vehicle.

The track 5 comprises several track segments, including two track segments 9A and 9B that are visible in FIG. 1. Each track segment 9A and 9B extends along the trajectory X5, and is delimited by two opposite longitudinal ends, called "segment ends". A segment end 11A of the segment 9A and a segment end 11B of the segment 9B are visible in FIG. 1. The segment 9A ends with the end 11A in the forward direction S1, while the segment 9B ends with the end 11B in the opposite direction. The ends 11A and 11B are spaced apart from each other longitudinally.

In the present example, each track segment 9A and 9B longitudinally and successively comprises an insulator section starting at the segment end, a conductor section and another insulator section ending at the other segment end. By "insulator" and "conductor", reference is made to an electrical property due to the electrical power for the supply of vehicles. The different sections of the track segments each form part of the contact surface 7 of the track 5. Only one of the insulator sections of each segment 9A and 9B is visible in FIG. 1, respectively with the reference 10A and 10B. The conductor section of each segment, which lies longitudinally between the two insulator sections of the segment concerned, evolves between a powered state and a non-powered state. When the conductor section is energized and in contact with the pickup shoe of a vehicle, power is transmitted to the vehicle. When the conductor section is not powered, no electrical power is transmitted. Each track segment is preferably of constant width along the trajectory X5.

More generally, each track segment is likely to comprise one or more conductor sections and/or one or more insulator sections, distributed longitudinally, as a function of the application.

The track 5 comprises several hoods, one hood 12 of which is visible in FIG. 1. Each hood is preferably made of metallic material, such as stainless steel. Each hood 12 preferably forms part of the contact surface 7. In particular, the hood 12 comprises a central portion 14, which forms the aforementioned part of the contact surface 7.

Each hood connects two successive track segments longitudinally. Two successive track segments are separated longitudinally by a hood, in particular by the central portion 14 of the hood in question, and preferably by a single hood. In the present example, the hood 12, more particularly the central portion 14, is arranged in the longitudinal extension of the track segment 9A in the forward direction S1, beyond the end 11A in this direction S1. In this case, the hood 12, more particularly the central portion 14, is applied against, i.e. in contact with, the end 11A. In the example, the hood 12, more particularly the central portion 14, is arranged in the longitudinal extension of the track segment 9B, in a direction opposite to the direction S1, beyond the end 11B. In the example, the hood 12, more particularly the central portion 14, is applied against, i.e. in contact with, the end 11B. The hood 12 is arranged longitudinally between the ends 11A and 11B, in particular with respect to its central portion 14.

Alternatively, the hood 12 may be at a short longitudinal distance from the end 11A and/or the end 11B.

The central portion 14 of each hood is preferably of constant width along the trajectory X5, preferably of the same width as the track segments, as is the case in FIG. 1 for the hood 12 and the segments 9A and 9B. In this case, the longitudinal edges of the central part of the hood and the track segments are longitudinally aligned.

The system 1 comprises several stringers distributed longitudinally, including a stringer 20A and a stringer 20B that are visible in FIG. 1. Each stringer extends longitudinally and ends with two opposite longitudinal ends called "stringer ends". In the example shown in FIG. 1, the stringer 20A ends longitudinally with a stringer end 21A in the forward direction S1, while the stringer 20B ends with a stringer end 21B in the opposite direction. In the case of a buried system, as for the illustrated example, each stringer rests on the bottom 33 of the furrow 32 and connects the side walls 34 transversely, i.e. each stringer occupies the entire internal volume of the furrow 32. Thus, the furrow 32 serves as a support on which the stringer rests, but also any other support that may be implemented as a function of the situation.

Preferably, each stringer is an integral piece made of electrically-insulating material, due to the electrical power supply. Alternatively, each stringer may be an assembly of several parts, wherein these parts are nonetheless integral pieces from one end to the other of the stringer. Each stringer is, for example, made of composite fiberglass, or any other material satisfying this application, for example fiber-reinforced concrete. In particular, each stringer constitutes a profile, or is the result of an assembly of profiles, each of which extends from one longitudinal end to the other of the stringer. The profile is, for example, obtained by pultrusion or extrusion.

The stringers are longitudinally spaced apart from each other. In particular, the ends 21A and 21B are longitudinally spaced apart from one another in order to define an inter-stringer space 30 between two successive stringers. The space 30 is delimited by the bottom 33 and the two stringers 20A and 20B. When the system is in the initial state as in FIG. 1, the space 30 is delimited, in particular, by a transverse face of each of the stringers 20A and 20B, wherein each of these transverse faces extends in planes parallel to the plane Y5-Z5, which is defined by the axes Y5 and Z5, wherein these transverse faces are respectively formed at the ends 21A and 21B. In this space 30, the system 1 advantageously comprises electrical equipment (not shown), such as, for example, a connection box or a junction box, or any other means for controlling or supplying the track segments adjacent to the space 30.

Each stringer supports one of the track segments, i.e. supports the track segment from below. Each stringer is thus arranged under the track segment in question. The stringers 20A and 20B respectively support the segments 9A and 9B, wherein these segments 9A and 9B are arranged on top of the stringers 20A and 20B. Preferably, each stringer comprises, on the top, a stringer groove extending longitudinally from one stringer end to the other stringer end, wherein each track segment is housed in one of the stringer grooves.

As is visible in FIG. 1, the stringers 20A and 20B respectively comprise a stringer groove 22A and a stringer groove 22B, in which the segments 9A and 9B are respectively housed. The stringer groove 22A ends longitudinally at the stringer end 21A in the S1 direction, while the stringer groove 22B ends longitudinally at the stringer end 21B.

In the vicinity of the stringer ends, the stringer grooves of two successive stringers support the hood, i.e. support the hood from below, through its central portion. In FIG. 1, the end 21A is longitudinally distant from the end 11A in the forward direction S1, in order to extend under the hood 12 as far as possible. The end 21B is longitudinally distant from the end 11B in the direction opposite to the direction S1 in order to extend under the hood 12 as far as possible. In FIG. 1, the central portion 14 of the hood 12 is supported:

by the groove 22A for the longitudinal end of the hood 12 opposite the direction S1;
by the groove 22B for the other longitudinal end of the hood 12 in the forward direction S1.

The central portion 14 of the hood 12 forms a bridge connecting the ends 21A and 21B in order to delimit the inter-stringer space 30 from above. Any equipment housed in the space 30 is thus protected by the hood 12.

In the upper part, each stringer advantageously comprises two longitudinal stringer edges bordering the stringer groove laterally and in lateral contact with the stringer segment in question. In particular, the stringers 20A and 20B respectively comprise a pair of edges 23A and 23B that border the grooves 22A and 22B. Each edge 23A or 23B extends from one longitudinal end to the other of the stringer in question. In particular, the edges 23A extend to the end 21A in the forward direction S1 and the edges 23B extend to the end 21B in the opposite direction. The system 1 comprises an upwardly-facing edge surface 24, a portion of which is formed by the edges 23A and 23B. The edge surface 24 extends in a plane parallel to and below the plane of the contact surface 7. The surface 24 extends at, or slightly above, the surface of the ground 3.

Each hood, like the hood 12 of the present example, advantageously has two lateral parts 15, arranged laterally on either side of the central portion 14. Each lateral portion 15 extends transversely opposite one another from the central portion 14. The lateral portions 15 respectively extend in the longitudinal extension of the edges 23A and 23B, and form part of the edge surface 24.

Preferably, each hood, in particular the lateral parts 15 of the hood in question, connects the edges of two successive stringers longitudinally. In the present example, the lateral parts 15 are respectively arranged in the longitudinal extension of the edges 23A in the forward direction S1 beyond the end 21A in the direction S1. In this case, the lateral parts 15 of the hood 12, are each applied against, i.e. in contact with the end 21A, laterally at the edges 23A. In the example, the lateral parts 15 are arranged in the longitudinal extension of the edges 23B in a direction opposite to the direction S1 beyond the end 21B. In the example, the lateral parts 15 are applied against, i.e. in contact with, the end 21B laterally at the edges 23A. At least part of the hood 12 is arranged longitudinally between the ends 21A and 21B, in particular with regard to the lateral parts 15. Thus, the hood 12 does not cover the edges 23A and 23B. For this, the lateral parts 15 are longitudinally shorter than the central portion 14. Longitudinally, the lateral parts 15 are advantageously arranged in a central position of the hood 12, so that the central portion 14 protrudes longitudinally in both directions, relative to the lateral parts 15.

As in the case of FR 2 938 800 A1, a metal fishplate (not shown), is advantageously provided in the space 30 in order to secure the stringers 20A and 20B together, while supporting the hood 12 by its lateral parts 15. Such a fishplate then provides a free space to house the aforementioned electrical equipment in the space 30.

The hood 12 is advantageously fixed to its various aforementioned supports by one or more screws, bolts, rivets, or any equivalent mechanical fixing device. In FIG. 1, four screws 35 pass through the hood 12, wherein two respectively pass through the lateral parts 15 to be implanted in the underlying fishplate, or in any implantation element fixed on the walls 34, while the other two pass through the central portion 14 in order to be respectively implanted in the stringer grooves 22A and 22B.

Preferably, each stringer comprises several longitudinal holes passing through the stringer from one end of the stringer to the other. One or more power, antenna and/or telecommunication cables longitudinally traverse the stringers and extend along and within one or more of these holes. These holes and cables are discussed below.

In its initial state illustrated in FIG. 1, each stringer 20A and 20B respectively comprises a part 25A and 25B to be replaced. The part 25A extends from the stringer end 21A in the direction opposite to the forward direction S1. The part 25B extends from the stringer end 21B in the forward direction S1. The part to be replaced advantageously comprises all or part of the stringer end in question, including, for example, a part of the groove and/or edges. As a result, the parts 25A and 25B support the hood 12, in particular the ends of its central portion 14. If a fishplate is provided in the space 30, it may also be desired to replace it, or at least reinforce it. It may be desired to replace the hood 12. In particular, it may be desired to replace all these elements because they are damaged or worn, as is the case for the parts 25A and 25B illustrated in FIG. 1.

In case of wear of the parts 25A, 25B and the possible fishplate, in the initial state, the hood 12 may be found to be incorrectly positioned, for example by being depressed downwards or rotated, deformed or even chipped, and thus differ from the representation of FIG. 1 and the foregoing description. The parts 25A and 25B may also be deformed, incorrectly oriented, or chipped.

To remedy this, a method of reinforcing the system 1 is implemented. As shown in FIG. 2, the method preferably comprises disassembly of the hood 12, and optionally disassembly of all or part of the fishplate, if a fishplate is provided, in particular to access the space 30. Then a separation step is performed to remove the parts 25A and 25B from their respective stringer 20A and 20B. Once the parts 25A and 25B are removed, the stringers terminate with a cut end. The cut end 26A of the stringer 20A is visible in FIG. 2. To effect this separation of the parts 25A and 25B, these stringers 20A and 20B are advantageously cut, for example with a saw, grinder, or any other appropriate means.

The cut end 26A forms a transverse, substantially planar, face of the stringer 20A, turned in the forward direction S1, and extending parallel to the plane Y5-Z5. The cut end 26B of the stringer 20B that is partially visible in FIG. 4, forms a transverse face of the stringer 20B, turned in the direction opposite to the forward direction S1, and extending parallel to the plane Y5-Z5. The space 30 is then enlarged longidinally. In particular, the groove 22A and 22B and the edges 23A and 23B then terminate respectively at the cut ends 26A and 26B.

For the separation step, it is advantageously provided that the cut end is longitudinally located between the original stringer end and the neighboring segment end. For the stringer 20A, the cut end 26A is located along the trajectory X5 in the direction opposite to the forward direction S1 with respect to the original end 21A. For the stringer 20B, the cut end 26B is located along the trajectory X5 in the forward direction S1 with respect to the original end 21B. In the illustrated example, the cut end 26A is longitudinally at the segment end 11A in order to maximize the space 30 in the longitudinal direction, without, however, altering the track segment 9A. However, it would be possible for the cut end to traverse the original track segment so that a portion of that original segment is separated during the separation step.

FIG. 2 shows that the stringer 20A of the present example is in a deteriorated state compared to its state when new. The aforementioned holes of the stringer 20A open at the cut end 26A.

FIG. 2 shows that the stringer 20A of the present example comprises an upper part provided with two lateral wings 37A, which project laterally and face in opposite directions. The wings 37A extend laterally on either side of the groove 22A and each carries one of the edges 23A. Longitudinally through these wings 37A, the stringer 20A comprises, among the aforementioned holes, respectively two holes 36A, called "antenna holes". Each hole 36A extends in the stringer 20A along and below the edges 23A, opening at the cut end 26A, once the separation step is performed. The system comprises two antenna cables 38, shown cut in FIG. 2. Each cable 38 respectively passes through one of the two antenna holes 36A. These antenna cables 38 serve to detect the presence of the vehicle above the track 5, in order to power the track 5 when such a vehicle is present, and not to supply the track 5 when the vehicle is absent or if a vehicle or an unauthorized object is present. Depending on the situation, it may be provided that the two antenna cables 38 are interconnected to form a loop, or a single antenna cable forming a loop and passing through the two holes 36A may be provided.

FIG. 2 shows that the stringer 20A has in the upper part, among the aforementioned holes, one or more holes 38A, for example three, arranged below the groove 22A, in particular at the height of the wings 37A.

FIG. 2 shows that the stringer 20A has a lower portion, extending below the upper part, in particular under the holes 38A. Preferably, the lower part is less extended laterally, i.e. thinner transversely, than the upper part, in order to correspond to the V-shape of the groove section 32, and, optionally, to allow the fishplate to be accommodated under the wings 37A, laterally on either side of the lower part between the walls 34 of the furrow 32. The stringer 20A rests on the bottom 33 via this lower part. The lower part comprises, among the aforementioned holes, one or more holes 39A, wherein at least one, if not more, is a "wiring hole". The system 1 advantageously comprises one or more cables 40, shown cut in FIG. 2, and contained longitudinally in one or more of these holes 39A. A cable 40 is preferably intended for the supply of electrical energy to the track 5. Alternatively, one or more of the cables 40 may be, for example, a ground or telecommunication cable.

Preferably, the characteristics of the stringer 20A in FIG. 2 are found symmetrically on the stringer 20B.

The method optionally comprises, after the separation step, a longitudinal insertion step of one or more reinforcing bars 41, in one or more of the holes of the stringer 20A, in order to reinforce the stringer 20A by supporting these holes, especially the holes whose walls are cracked, broken or reduced to dust by wear. Each bar 41 is preferably adjusted, i.e. it has a cross-section that is clamped in the hole concerned. It is preferred to introduce such bars 41 only into the empty holes. However, such bars 41 may be introduced into an occupied hole, in particular by means of a cable.

Preferably, the introduction step comprises the successive introduction of several bars 41 longitudinally one after the other in the same hole of the stringer 20A, wherein the last bar so introduced is used to push the bars 41 previously introduced into the same hole in the direction opposite to the direction S1. Thus, it is possible to fill a non-negligible longitudinal portion of this hole, extending from the cut end 26A, with a longitudinal succession of bars 41 in order to support this hole. This is especially useful when the stringer 20A and the trajectory X5 are curved.

Preferably, the cross-section of each bar is generally quadrilateral in shape, for example rectangular or square as illustrated in FIG. 2. It is preferred that the corners of the quadrilateral section are chamfered, which facilitates the operation of introducing the bars 41 by improved longitudinal sliding of the latter in the holes.

Each bar 41 is preferably made of plastic, which is electrically insulating due to the electrical quantities involved for the supply of the vehicle. Preferably, the plastic material chosen is a plastic material based on polyamide-6 (PA6), such as Ertalon (registered trademark), which provides good electrical insulation, while having sufficient mechanical characteristics to ensure the reinforcement of the stringer 20A and a high resistance to the environment. This plastic material has the advantage of being easily reworked and/or intersected in situ, just before the introduction step, in order to adapt the geometry of the bars to the case in question.

Figure 3:
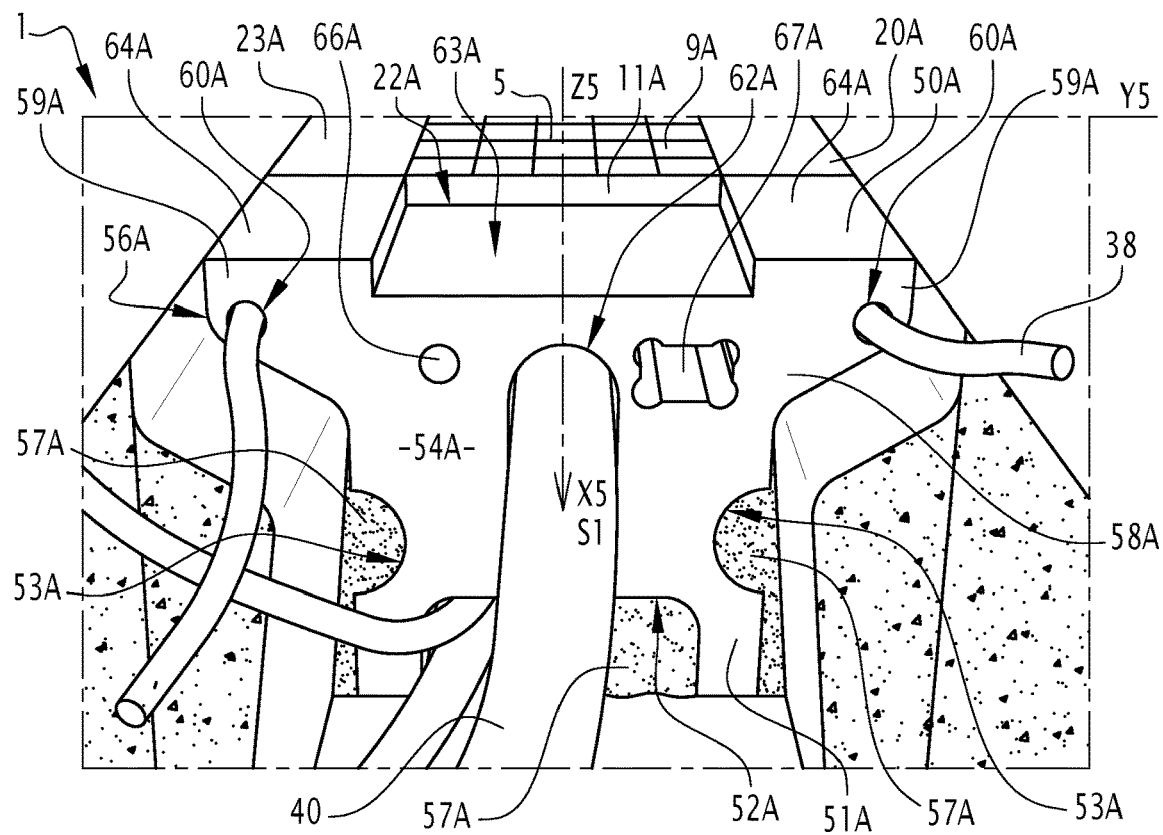
Figure 4:
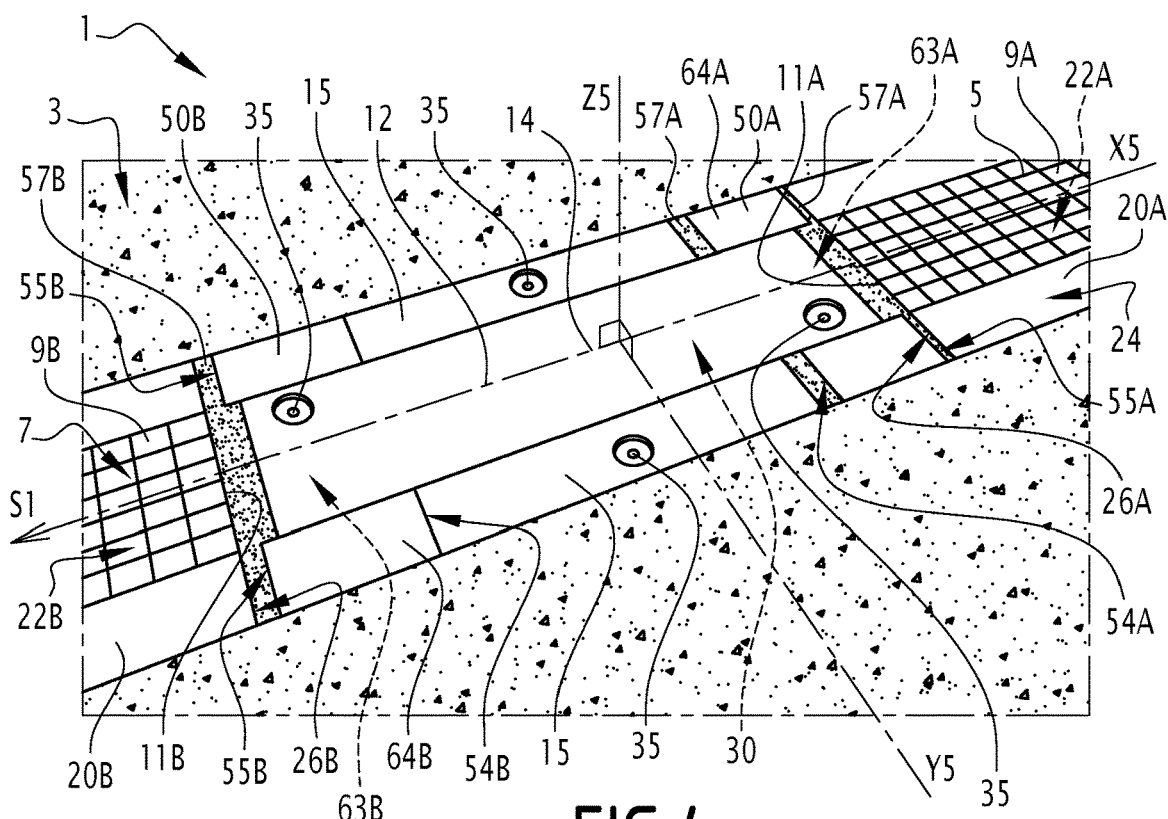
FIG. 4 shows a view similar to FIG. 1, of the power supply system of FIG. 1 in a reinforced state, including the reinforcing piece of FIG. 3.
Figure 5:
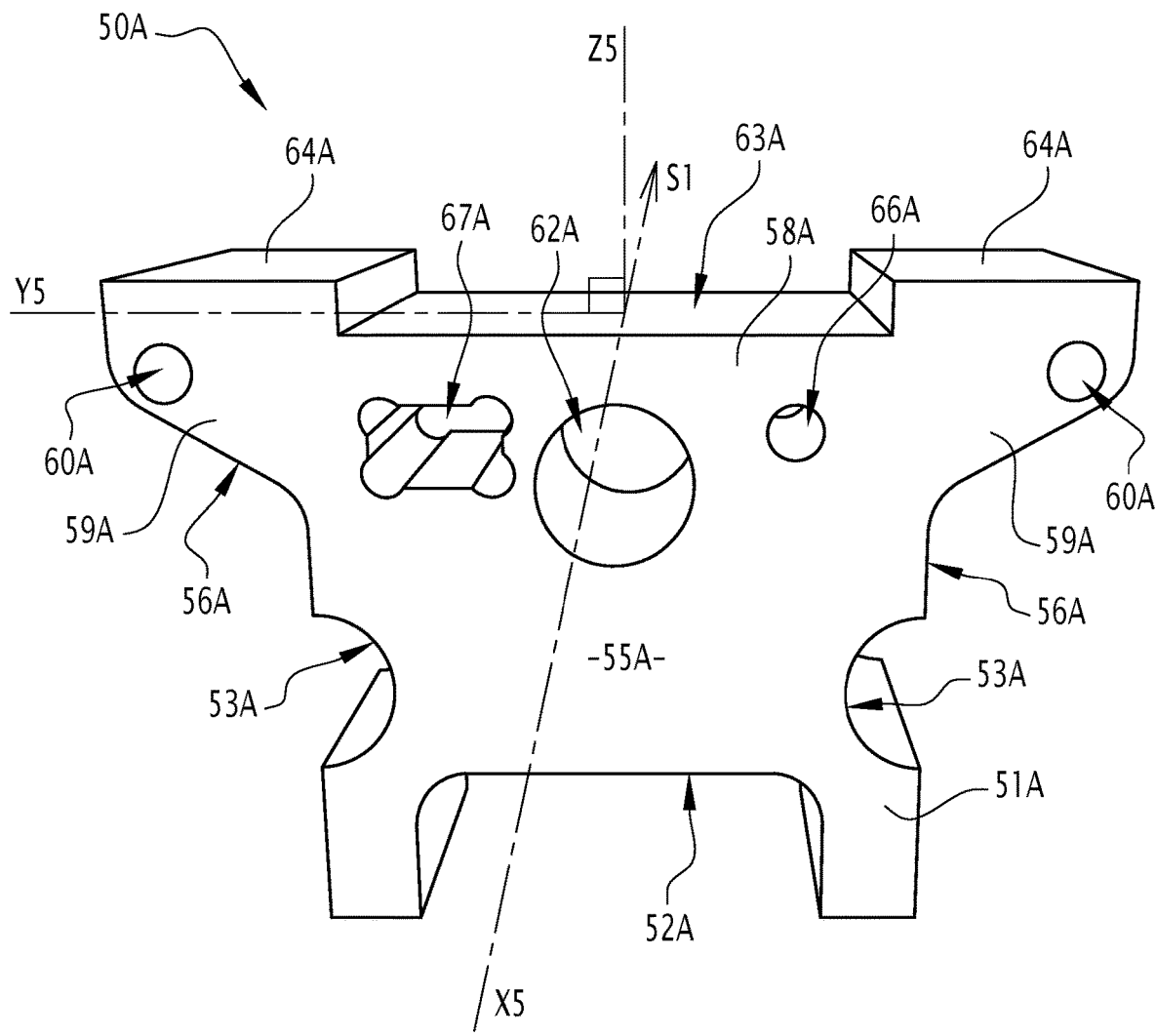
FIG. 5 shows a perspective view of the reinforcing piece of FIGS. 3 and 4.

The reinforcing method comprises, after the step of separating the parts to be replaced, and after the optional step of introducing reinforcing bars, a step of adding a reinforcing piece to each cut end, i.e. replacing each part to be replaced. Preferably, a single reinforcing piece is provided at the cut end. In the present example, as shown in FIGS. 3 to 5, a reinforcing piece 50A is added to the cut end 26A of the stringer 20A, and a reinforcing piece 50B that is partially visible in FIG. 4, to the cut end 26B of the stringer 20B. For this addition, the reinforcing piece 50A or 50B is applied, i.e. mounted, against the cut end 26A or 26B in question. For the end 26A, the piece 50A longitudinally extends the stringer 20A in the forward direction S1. For the end 26B, the piece 50B longitudinally extends the stringer 20B in the opposite direction.

Preferably, the two reinforcing pieces 50A and 50B are identical, symmetrical or at least similar in their characteristics. Thus only the reinforcing piece 50A is described, as this description applies mutatis mutandis for the piece 50B, in particular by replacing "A" by "B" to designate the same characteristics, as regards the reference signs in the drawings. It is the same for the segments 9A and 9B, as well as the stringers 20A and 20B.

Preferably the reinforcing piece 50A is a longitudinal section, having an unvarying, or essentially unvarying, cross-section along the entire length of the piece 50A. When the piece 50A is in place in the system 1 against the cut end 26A, its length is parallel to the trajectory X5. In what follows, for convenience, the trajectory X5 is related to a longitudinal axis of the piece 50A, the axis Y5 to a transverse axis of the piece 50A, and the axis Z5 to a height axis of the piece 50A.

The piece 50A comprises two transverse faces, i.e. orthogonal to the trajectory X5, wherein:
- a face 54A visible in FIG. 3, referred to as the "access face", is turned in the forward direction S1; and
- a face 55A visible in FIG. 5, turned in the opposite direction.

The faces 54A and 55A form the longitudinal ends of the piece 50A, are connected by a contour face 56A, and flow parallel to the trajectory X5. Likewise, the faces 55B and 55B form the longitudinal ends of the part 50B, as may be seen in FIG. 4.

When the piece 50A is applied against the cut end 26A, the face 55A is preferably in flat support against the transverse face of the stringer 20A formed at the end 26A. As may be seen in FIG. 4, a layer of sealing material 57A is preferably interposed between the face 55A and the transverse face of the stringer 20A in order to fix these faces together.

When the piece 50A is applied against the end 26A, the piece 50A and the face 54A are intended to replace the original stringer end 21A. The face 54A is then advantageously at a longitudinal position similar to that occupied by the end 21A before separation and is left free.

Preferably, the contour face 56A conforms to the contour of the U or V cross-section of the furrow 32, in order to avoid a local modification of this cross-section. Preferably, the piece 50A has a cross-section whose contour is similar to, or is comprised within the contour of, the cross-section of the stringer 20A. The cross-sections of the stringer 20A and the piece 50A correspond when the piece 50A equips the system 1, as may be seen in FIG. 3.

In the present example, the piece 50A comprises a base 51A, which constitutes a lower part of the piece 50A and advantageously has a transverse shape similar to the aforementioned lower part of the stringer 20A. The piece 50A rests on the bottom 33, or any support on which the stringer 20A rests. The base 51A follows the shape of the lower part of the furrow 32, in particular the bottom 33 and the bottom of the walls 34.

The base 51A comprises, in the present example, a lower sealing notch 52A, arranged transversely in the middle of the base 51A, and opening downwards. This notch 52A is formed by the contour face 56A. When the piece rests on the bottom 33, the notch 52A provides a longitudinal free cavity, delimited by the bottom 33 and the contour of the notch 52A, at the bottom of the base 51A.

The base 51A comprises, in the present example, two opposite lateral sealing notches 53A, formed by the face 56A at the base 51A, above the notch 52A. The notches 53A are open parallel to the axis Y5, towards the outside, in order to each provide a cavity that is delimited by the notch 53A in question and one of the walls 34.

More generally, the base 51A comprises one or more longitudinal sealing notches, such as the notches 52A and 53A, opening radially, i.e. laterally or downwards, relative to the trajectory X5. A sealing material 57A is introduced into each sealing notch in order to ensure the attachment of the reinforcing piece 50A to the furrow 32, or any support provided for the stringer 20A. This sealing material is, for example, a chemical binder, an adhesive mortar, a mortar, a cement or any other suitable material. The implementation of such a sealing material ensures effective attachment of the piece 50A, while allowing adjustment of the position of this piece 50A when the geometry of the support does not correspond exactly to that of the piece 50A.

The reinforcing piece 50A comprises an upper portion 58A above the base 51A. This upper portion 58A advantageously has a transverse shape similar to that of the stringer 20A. In particular, the upper part 58A has a dovetail shape, just like the stringer 20A. For this, the piece 50A advantageously comprises, in the upper portion 58A, two lateral reinforcing wings 59A, which protrude and are laterally opposite one another, and are arranged in the longitudinal extension in the direction S1 of the wings 37A. In particular, the wings 59A protrude from the base 51A, parallel to the axis Y5.

FIG. 4 shows the system 1 when it is in a reinforced state, and wherein all the steps of the method having been carried out.

The method comprises a step of mounting the hood 12 on the reinforcing piece 50A, so that the hood is supported by the piece 50A, in particular by the upper portion 58A. As shown in FIG. 4 in the example, the hood 12 is supported both by the two reinforcing pieces 50A and 50B by connecting the latter longitudinally in the manner of a bridge. It should be noted that the reinforcing pieces 50A and 50B are spaced apart longitudinally in order to leave free and delimit the inter-stringer space 30, while preferably substantially keeping the geometry and the initial dimensions of this space 30.

The piece 50A preferably comprises a reinforcing groove 63A, which extends the stringer groove 22A longitudinally in the forward direction S1. The groove 63A is formed by the face 56A at the top of the upper portion 58A between the wings 59A. The groove 63A is open upwards and extends from the face 54A to the face 55A. The piece 50A is so designed that the groove 63A corresponds with the groove 22A and replace the separate portion of the groove 22A. In particular, the bottom grooves 22A and 63A extend in the same plane, while their lateral edges are spaced apart and positioned in the same way.

In FIG. 4, it may be seen that the central portion 14 of the hood 12 is supported:
- by the groove 63A of the piece 50A, for the longitudinal end of the hood 12 opposite the direction S1;
- by a groove 63B of the part 50B, for the other longitudinal end of the hood 12 in the forward direction S1.

Preferably, the central portion 14 covers most, or all, of the grooves 63A and 63B, without exceeding these grooves 63A and 63B laterally.

More generally, the hood is arranged at least partly in the two reinforcing grooves and is supported by the reinforcing pieces 50A and 50B.

The piece 50A comprises two reinforcing edges 64A that border the groove 63A laterally and on either side of this groove 63A. The edges 64A extend the edges 23A longitudinally in the forward direction S1. Each edge 64A extends longitudinally from the face 54A to the face 55A to form a portion of the edge surface 24, as well as the portion of the original edges 23A that were separated. Each reinforcing edge 64A is formed on the top of one of the wings 59A.

The hood 12 partially covers the groove 63A, but does not cover the edges 64A. The lateral portions 15 extend respectively in the longitudinal extension of the edges 64A in the forward direction S1, and form part of the edge surface 24. Thus, the lateral portions 15 connect the edges 64A of the piece 50A to the edges 64B longitudinally in a similar manner to that of the piece 50B. It may be provided that the lateral parts 15 are each applied against, i.e. in contact with, the face 54A of the piece 50A, just like the face 54B, along the trajectory X5. However, as in the illustrated example, if there is a longitudinal gap or play between the portions 15 and one or two faces of the faces 54A and 54B, this space may be filled with a layer of sealing material 57A or 57B, laterally at the edges 23A.

Thus, thanks to the pieces 50A and 50B, the hood 12 is therefore suitably arranged, as initially, in particular to form:
- a portion of the contact surface 7, in the same plane as the contact surface portion 7 that is formed by the adjacent track segments, and
- a portion of the edge surface 24, in the same plane as the edge surface portions 24 formed by the adjacent stringer edges.

As illustrated in FIG. 4, at least a portion of the screws 35 or equivalent fastening means, are located in each piece 50A and 50B through the central portion 14 of the hood 12. In the present example, a screw 35 fixes the hood 12 against the groove 63A via a longitudinal end of the central portion.

Preferably, the piece 50A comprises one or more longitudinal wiring ducts 62A that are, in particular, arranged in the upper portion 58A between the flanges 59A. Each duct 62A extends longitudinally through the piece 50A, from the face 54A to the face 55A. The reinforcing piece 50A is adjacent so that each wiring duct 62A extends a portion of one of the holes 39A of the stringer 20A longitudinally in the forward direction S1, in particular the hole 39A in which the cables 40 are arranged. More specifically, the duct 62A faces an upper portion of the hole 39A. When the piece 50A is added, it is ensured that the cables 40 pass through the ducts 62A of the piece 50A. Preferably, as shown in FIGS. 3 and 5, a single wiring duct 62A is arranged at the bottom of the upper portion 58A, i.e. centrally in the piece 50A. Each duct 62A advantageously has a narrower cross-section than that of its corresponding hole 39A in order to stabilize the positioning of the cable 40 in question. Each duct 62A advantageously has a circular section, or any section corresponding to that of the cable 40 in question, in order to fit around this cable 40.

The piece 50A preferably comprises two antenna ducts 60A, wherein each antenna duct passes longitudinally through one of the two wings 59A, from the face 54A to the face 55A. The piece 50A is arranged so that each duct 60A respectively extends one of the two antenna holes 36A of the stringer 20A longitudinally in the forward direction S1. During the addition of the piece 50A, it is ensured that the antenna cable 38 passes through the two antenna ducts 60A. Each duct 60A advantageously has a narrower cross-section than that of the antenna holes 36A in order to stabilize the positioning of the antenna cable 38 therein. Each duct 60A advantageously has a circular section, or any section corresponding to that of the antenna cable 38 in order to fit around this cable 38.

The piece 50A preferably comprises a longitudinal hole 67A, called the "access hole", which passes from the face 54A to the face 55A. At a minimum, the hole 67A may be blind and open on the access face 54A in the forward direction S1 in order to allow longitudinal access to its internal volume. This hole 67A extends in the upper portion 58A of the piece 50A, just below the groove 63A, preferably laterally beside the duct 62A.

At least one of the screws 35 passes through the central portion 14 of the hood 12 and then the piece 50A, from the groove 63A, in order to open inside the access port 67A. A nut, or any equivalent clamping piece interacting with the screw 35 or the intended fastening means, may thus be introduced via the hole 67A. The screw 35 associated with the nut forms a bolt. A strong and easy attachment to implement the hood 12 on the piece 50A is thus made possible.

More generally, there is provided a mechanical fastening device comprising a primary element, such as the screw of this example, or a rivet, and a secondary part, such as a nut in the present example, or any support or clamping piece to which the primary element may be fixed. The primary element passes through the hood and the reinforcing piece while the secondary element is housed, preferably entirely, in the access port. The primary element and the secondary element are connected together inside the access hole, for example by screwing, interlocking, clamping, crimping or welding, in order to ensure the fixing of the hood on the reinforcing part.

The various holes mentioned above may be provided in advance, during the manufacture of the piece 50A. However, it is also possible to provide one or more longitudinal through or blind pre-drilling. For example, the pre-drilling 66A visible in FIGS. 3 and 5 passes through the upper portion 58A of the face 54A to 55A. Depending on the situation, one or more pre-drillings of the piece 50A may give rise to in situ formation, before or after the step of adding the piece 50A, holes for different functions. For example, the hole 67A may be formed through pre-drilling similar to the pre-drilling 66A.

The piece 50A is particularly versatile and adaptable to the situation.

One or more longitudinal mechanical fastening means may be provided, such as screws or the like, that are flush with the face 54A or arranged in holes opening on this face 54A, wherein the fastening means pass through the piece 50A implanted in the bars 41, in order to fix or stabilize these bars 41.

The piece 50A is essentially made of plastic material, i.e. a substantial portion is made of plastic, for example more than 95% of its mass. Preferably, the piece 50A is made totally of this plastic material. The piece 50A is thus electrically insulated against the electrical energy involved in the system 1. As a plastic material, polyamide-6, in particular Ertalon, which has the abovementioned advantages, is preferred. Preferably, the plastic material of the bars 41 is the same plastic as that of the piece 50A.

Preferably, the piece 50A is made integrally in one piece, for example by extrusion, pultrusion, or even by molding.

The invention may also have the object of the reinforcing piece 50A or 50B comprising one or more of the characteristics defined in the foregoing.

The invention claimed is:

1. A ground-based system for powering a vehicle, wherein the system comprises:
   a track, which defines a trajectory of the system, wherein the track is designed to be in contact with a pickup shoe of the vehicle during movement of the vehicle along the trajectory, wherein the track comprises:
     at least one track segment terminating at a segment end in a forward direction of the trajectory, and
     at least one hood, which is arranged as an extension of the track segment along the trajectory in the forward direction beyond the segment end;
   at least one stringer, which supports the track segment and which extends along the trajectory ending with a cut end in the forward direction;
   wherein the system further comprises at least one reinforcing piece which is applied to the cut end in order to extend the stringer in the forward direction, wherein the reinforcing piece is essentially made of plastic and supports the hood, wherein the system comprises a support on which the stringer and the reinforcing piece rest, wherein the reinforcing piece comprises a base, through which the reinforcing piece rests on the support, wherein the base comprises at least one sealing notch that extends parallel to the trajectory and opens radially with respect to the trajectory, and wherein a sealing material is introduced into the sealing notch to ensure the fixing of the reinforcing piece to the support.

2. The system according to claim 1, wherein the plastic material of the reinforcing piece is polyamide 6.

3. The system according to claim 1, wherein:
the stringer comprises a stringer groove, which extends along the trajectory, to the cut end in the forward direction, while the track segment is housed in the stringer groove; and
the reinforcing piece comprises a reinforcing groove, which extends the stringer groove in the forward direction, while the hood is arranged at least partially in the reinforcing groove and is supported by the reinforcing piece.

4. The system according to claim 3, wherein:
the stringer comprises two stringer edges bordering the stringer groove; and
the reinforcing piece comprises two reinforcing edges bordering the reinforcing groove by extending the grooves in the forward direction, wherein the hood is arranged at least partially in the reinforcing groove without covering the reinforcing edges.

5. The system according to claim 4, wherein:
the stringer comprises two antenna holes, which respectively extend in the stringer along the stringer edges, and open at the cut end;
the reinforcing piece comprises two reinforcing wings, which protrude opposite one another, wherein each of the two reinforcing wings support one of the reinforcing edges, wherein the reinforcing piece comprises two antenna ducts, wherein each of the two antenna ducts passes through one of the two reinforcing wings, wherein the reinforcing piece is so arranged that each of the two antenna ducts respectively extends one of the two antenna holes in the forward direction; and
the system comprises at least one antenna cable, which passes through one of the two antenna holes and the two antenna ducts.

6. The system according to claim 1, wherein:
the hood is fixed on the reinforcing piece using at least one mechanical fixing device, wherein the mechanical device comprises a primary element, and a secondary element to which the primary element is attached;
the reinforcing piece comprises an access hole, which opens in the forward direction on an access face of the reinforcing piece; and
the primary element of the mechanical device passes through the hood and the reinforcing piece in order to extend into the access hole, in which is housed the secondary element.

7. The system according to claim 1, wherein:
the stringer comprises at least one wiring hole, which extends along the trajectory and which opens at the cut end;
the reinforcing piece comprises at least one wiring duct, wherein the reinforcing piece is arranged in such a way that the wiring duct extends the wiring duct in the forward direction; and
the system comprises at least one power cable of the track, which passes through the wiring hole and the wiring duct.

8. A method for reinforcing a ground-based system for powering a vehicle, wherein the system comprises:
a track, which defines a trajectory of the system, wherein the track is designed to be in contact with a pickup shoe of the vehicle during movement of the vehicle along the trajectory, wherein the track comprises:
at least one track segment terminating at a segment end in a forward direction of the trajectory, and
at least one hood, which is arranged as an extension of the track segment along the trajectory in the forward direction beyond the segment end;
at least one stringer which supports the track segment and which extends along the trajectory terminating in a stringer end in the forward direction, wherein the stringer comprises a portion to be replaced, extending from the stringer end in a direction opposite to the forward direction, wherein the hood is supported by the portion to be replaced;
wherein the method comprises:
separating the portion to be replaced from the stringer, so that the stringer terminates with a cut end in the forward direction;
adding at least one reinforcing piece of the cut end, by applying the reinforcing piece against, or opposite, the cut end in order to extend the stringer in the forward direction, wherein the reinforcing piece is made essentially of plastic material; and
mounting the hood on the reinforcing piece, so that the hood is supported by the reinforcing piece,
wherein the system comprises a support on which the stringer and the reinforcing piece rest,
wherein the reinforcing piece comprises a base, through which the reinforcing piece rests on the support, wherein the base comprises at least one sealing notch that extends parallel to the trajectory and opens radially with respect to the trajectory,
the method comprising introducing a sealing material into the sealing notch to ensure the fixing of the reinforcing piece to the support.

9. The method according to claim 8, wherein:
the stringer has at least one empty hole, which extends along the trajectory and which opens at the cut end; and
the method comprises a step of introducing at least one reinforcing bar of plastic material into the empty hole in an adjusted manner in order to support the empty hole.

10. The method according to claim 9, wherein the plastic material of the reinforcing bar is the same plastic as the of the reinforcing piece.

11. The system according to claim 1, wherein the stringer is made of composite material of pultruded fiberglass.

* * * * *